United States Patent [19]
Gordon et al.

[11] Patent Number: 6,057,540
[45] Date of Patent: May 2, 2000

[54] MOUSELESS OPTICAL AND POSITION TRANSLATION TYPE SCREEN POINTER CONTROL FOR A COMPUTER SYSTEM

[75] Inventors: Gary B. Gordon, Saratoga, Calif.; Donald E. Morris, Ft. Collins, Colo.

[73] Assignee: Hewlett-Packard Co, Palo Alto, Calif.

[21] Appl. No.: 09/070,422

[22] Filed: Apr. 30, 1998

[51] Int. Cl.[7] .............................. G06M 7/00; G09G 5/08
[52] U.S. Cl. ...................... 250/221; 345/161; 345/168; 345/175
[58] Field of Search ................... 250/221; 341/5; 345/158, 160, 161, 168, 175

[56] References Cited

U.S. PATENT DOCUMENTS 5,530,456  6/1996  Kokubo ..................................... 345/175
5,694,123  12/1997  Selker et al. .............................. 341/21

*Primary Examiner*—Edward P. Westin
*Assistant Examiner*—Glenn Kinnear
*Attorney, Agent, or Firm*—Edward L. Miller

[57] ABSTRACT

A mouseless, optical and position translation type screen pointer control images a portion of the texture or fingerprint on one of the user's digits, which may be a thumb or a finger. Motion of the digit produces motion of the image that is detected by a movement sensor and is translated into corresponding motion of the screen pointer. The digit is placed onto an end of a rod lens that either extends upward amongst the keys: say, proximate the junction of the "H", "J", "Y" and "U" keys; or, horizontally outward from the front edge of the keyboard. As the image "moves" within the movement sensor a portion of it disappears from the field of view, and is replaced with other image patterns. A sufficiently changed image is maintained as a new current image, which then itself changes, and so on. A comparison between a reference frame (previous image) and the current frame (present image) allows detection of the amount and direction of image motion. These detected amounts corresponds to rotation of a mouse ball, and are sent to the computer's software to be treated as such. Since there is now no mouse, the buttons or switches that are part of a regular mouse may be replicated as separate keys on the keyboard. The SPACE bar may be shortened to provided room for these new keys.

9 Claims, 2 Drawing Sheets

MOUSELESS OPTICAL AND POSITION TRANSLATION TYPE SCREEN POINTER CONTROL FOR A COMPUTER SYSTEM

REFERENCE TO RELATED PATENTS

This Application is related to the subject matter described in the following two U.S. Pat. No. : 5,578,813 filed Mar. 2, 1995, issued Nov. 26, 1996 and entitled FREEHAND IMAGE SCANNING DEVICE WHICH COMPENSATES FOR NON-LINEAR MOVEMENT; and 5,644,139, filed Aug. 14, 1996, issued Jul. 1, 1997 and entitled NAVIGATION TECHNIQUE FOR DETECTING MOVEMENT OF NAVIGATION SENSORS RELATIVE TO AN OBJECT. Both of these Patents have the same inventors: Ross R. Allen, David Beard, Mark T. Smith and Barclay J. Tullis, and both Patents are assigned to Hewlett-Packard Co. This application is also related to the subject matter described in U.S. Pat. No. 5,786,804 issued Jul. 28, 1998 and filed Oct. 6, 1995, entitled METHOD AND SYSTEM FOR TRACKING ATTITUDE, and also assigned to Hewlett-Packard Co. These three Patents describe techniques for the tracking of position movement and for the assembly of scanned portions of a document into an entire document. Those techniques are a component in the preferred embodiment described below. Accordingly, U.S. Pat. Nos. 5,578,813, 5,644,139 and 5,786,804 are hereby incorporated herein by reference.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface slide easily over the fabric, but the rubber ball does not skid, but instead rolls as the mouse is moved. Interior to the mouse are rollers, or wheels, that contact the ball at its equator and convert its rotation into electrical signals representing orthogonal components of mouse motion. These electrical signals are coupled to the computer, where software responds to the signals to change by a $\Delta x$ and a $\Delta y$ the displayed position of a pointer (cursor) in accordance with movement of the mouse. The user moves the mouse as necessary to get the displayed pointer into a desired location or position. Once the pointer on the screen points at an object or location of interest, one of one or more buttons on the mouse is activated with the fingers of the hand holding the mouse. The activation serves as an instruction to take some action, the nature of which is defined by the software in the computer.

Unfortunately, the usual sort of mouse described above is subject to a number of shortcomings. Among these are deterioration of the mouse ball or damage to its surface, deterioration or damage to the surface of the mouse pad, and degradation of the ease of rotation for the contact rollers (say, (a) owing to the accumulation of dirt or of lint, or (b) because of wear, or (c) both (a) and (b)). All of these things can contribute to erratic or total failure of the mouse to perform as needed.

The underlying reason for all this trouble is that the conventional mouse is largely mechanical in its construction and operation, and relies to a significant degree on a fairly delicate compromise about how mechanical forces are developed and transferred.

Over the years, a number of optical techniques have been proposed for a computer mouse, but to date the mechanical mouse remains the most widely used pointing device. One recent optical development that appears likely to gain a significant degree of acceptance is that described in U.S. patent application Ser. No. 09/052,046, entitled SEEING EYE MOUSE FOR A COMPUTER SYSTEM, filed Mar. 30, 1998, by Gordon, Knee, Badyal and Hartlove and assigned to Hewlett-Packard Co. That Application discloses the use of techniques described in the aforementioned incorporated Patents to produce an optical mouse that navigates upon an arbitrary surface. The device disclosed therein is a non-mechanical mouse that is viable from a manufacturing perspective, relatively inexpensive, reliable, and appears to the user as essentially the operational equivalent of the conventional mouse. This new type of optical mouse has a familiar "feel" and is free of unexpected behaviors. It does not rely upon cooperation with a mouse pad, whether special or otherwise, but is instead able to navigate upon almost any arbitrary surface. It uses a single imaging integrated circuit to track translation of that circuit (and by implication, the mouse itself) across the arbitrary surface.

It is still a mouse, however, and needs some sort of surface to operate upon. Laptop computers and certain cluttered work environments are not hospitable to a mouse, whether conventional or optical. For example, the makers of laptop computers have gone to considerable trouble to provide mouse-like pointing sans the mouse. There have been joy sticks that pivot, stick-on track balls and pop-out pantographs, just to name a few. One laptop has a small stick that pops up between the keys and controls the screen pointer according to the force applied to it with a fingertip. Placed next to the "J" key on the keyboard, it has the advantage of letting the hands stay at the home position on the keyboard. Track balls and pantographs are either fussy or mechanically delicate, while the force sensing stick takes a lot of getting used to, as it does not translate one spatial position (hand/mouse combination) to another (screen pointer position). Instead, it moves the screen pointer in response to motionless pressure. There have been well designed and properly executed tests that show that screen pointer control paradigms that operate by translating a spatial position to become the pointer location (i.e., that involve actual movement) are faster and more accurate, and hence easier to use.

It would be desirable if the optical mechanism of the (above-mentioned) seeing eye mouse that allows tracking on an arbitrary surface could be adapted to allow position translation type screen pointer control, but without an actual mouse or other moveable appendage that wears, binds or gets bent or broken off entirely. It would be a further advantage if such an optical mechanism also allowed the hands to remain at the home position on the keyboard. What to do?

SUMMARY OF THE INVENTION

A solution to the problem of mouseless, optical and position translation type screen pointer control is to image a portion of the texture (think: "fingerprint") on one of the user's digits, which may be a thumb or a finger. Motion of the digit produces motion of the image that is detected by a movement sensor and is translated into corresponding motion of the screen pointer. The digit is placed onto an end of a rod lens that either extends upward amongst the keys: say, proximate the junction of the "H", "J", "Y" and "U" keys; or, horizontally outward from the front edge of a bezel at the center of the keyboard. The former placement cooperates well with the right forefinger, while the latter works well with either thumb. As the image "moves" within the movement sensor a portion of it disappears from the field of view, and is replaced with other image patterns from an adjacent portion of the digit. A sufficiently changed image is maintained as a new current image, which then itself changes, and so on. A comparison between a reference frame (previous image) and the current frame (present image) allows detection of the amount and direction of image motion. These detected amounts correspond to rotation of a mouse ball, and are sent to the computer's software to be treated as such. Since there is now no mouse, something must be done to replicate the buttons or switches that are part of the regular mouse. In this invention they may reappear as additional keys on the keyboard. In particular, they could be located in positions freed by a shortening of the SPACE bar. These keys would talk to the mouse driver, however, and not to the keyboard driver.

DESCRIPTION OF A PREFERRED EMBODIMENT

Figure 1:
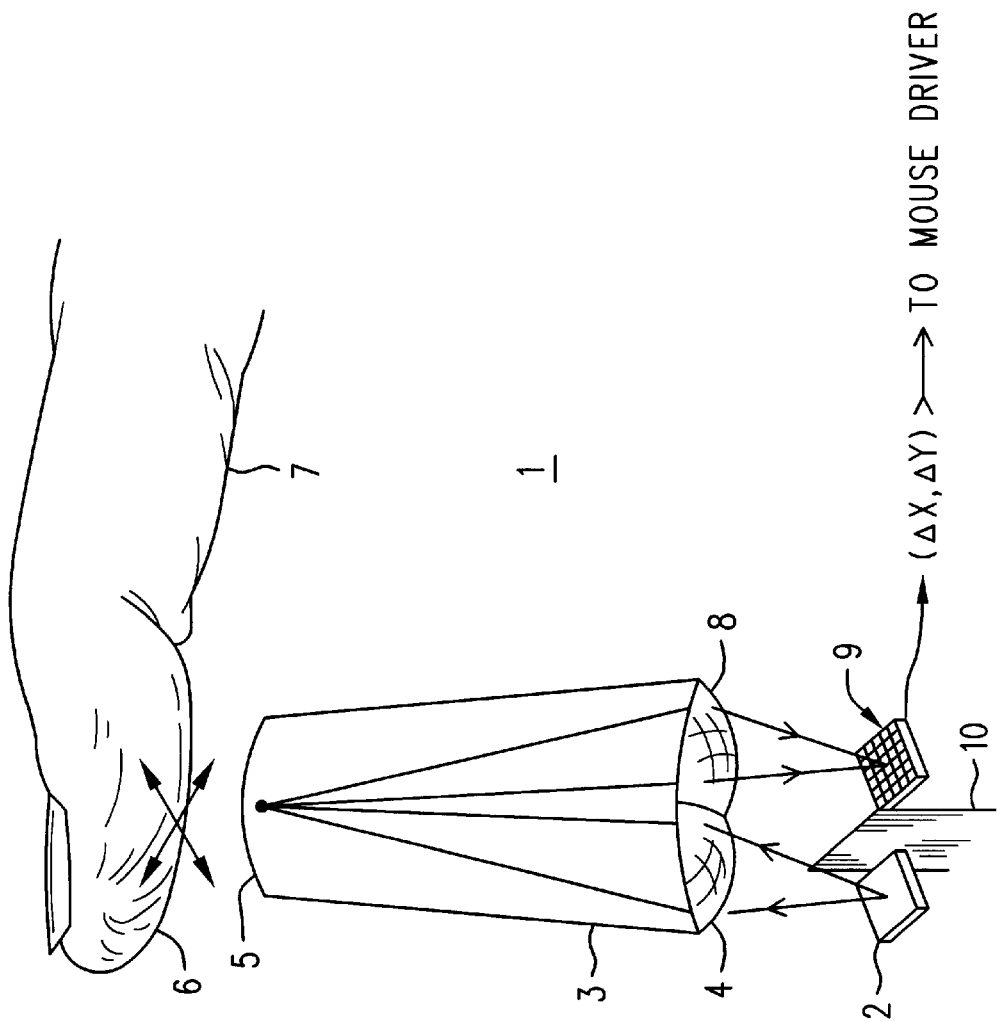
FIG. 1 is a simplified pictographic side view of the main components, in isolation, of the mouseless, optical and motion translation type screen pointer control mechanism.

Refer now to FIG. 1, wherein is shown a simplified representation of a side view of a motion detection arrangement 1 suitable for tracking the movement of a human finger 7 pressed against a surface 5 of a transparent stud 3, which may be made of plastic. A light source 2, which may be an LED, emits light that is gathered and focused by lens 4 to illuminate surface 5. Surface 5 may be flat, or preferably, have a slight curvature. Curvature aids in enlarging the size of the region of surface 5 that is in focus for the motion detector 9 described below. Surface 5 may be a glass or other wear resistant coating applied to the end of transparent stud 3. Surface 5 may be about 3/16 to 1/4 of an inch in diameter, and the length of transparent stud 3 may range from about 3/8 to 3/4 of an inch. Another term that is descriptive of the transparent stud 3 is "rod lens".

When the tip 6 of finger 7 is pressed against surface 5 the ridges of skin and any other micro texture features are visible in the plane of that surface, just as if they were a part of that surface. Lens 8 focuses light from those features onto an array of photo detectors that is part of a movement sensor 9. Movement sensor 9 automatically acquires and tracks any suitable image. When tracking an image it produces incremental (X, Y) signals that are then used in place of those from a mouse.

Lifting the fingertip 6 away from surface 5 by even a few thousandths of an inch defocuses the image and produces a loss of tracking. This condition is detected within the motion detector, and the production of incremental (X, Y) signals ceases. This has the effect of leaving the screen pointer unchanged at whatever location it currently occupies, and is exactly the same as when the user of a mouse removes his hand from that mouse. When the fingertip 6 is subsequently replaced on surface 5 the motion detector appreciates that an image has been acquired, and treats that acquisition as though a reset has been performed. That is, until there has been new motion subsequent to the new acquisition the incremental coordinates (X, Y) will have the value (0, 0). This leaves the existing position of the screen pointer undisturbed until such time as it is deliberately moved by motion of the finger 7, and corresponds exactly to a mouse user's placement of his hand back on the mouse without moving it.

Opaque barrier 10 keeps stray light from the LED 2 from reaching the motion detector 9.

The technique described above clearly depends upon the properties of the motion sensor 9. It uses exactly or substantially the same technique as the imaging and navigation arrangement described in the incorporated Patents. In the particular operational settings described therein it was desirable that there be some magnification of the image before it reached the sensor, owing to the small size of the microfeatures being imaged and tracked (e.g., paper fibers). Here, the features on the fingertip 6 are really quite large in comparison, so that magnification is not needed.

Even though the imaging and navigation mechanism is described in the incorporated Patents, for the convenience of the Reader we shall now indulge in a very brief overview of the technique used by that mechanism.

An LED 2, which may be an IR LED, emits light which is projected by a lens (4) onto a region (5) that is part of a work surface (6) to be imaged for navigation. The ideal angle of incidence for relatively opaque material is grazing illumination within the range of five to twenty degrees. In the present setting that is not practical owing to the length of transparent stud 3, and even if it were, the advantage is limited anyway, because of the transparency of the skin. It turns out that tracking works quite well despite the lack of oblique illumination.

An image of the illuminated region (6) is projected through an optical window (which may be transparent stud 3 itself) in a package (not itself shown) of an integrated circuit (9) and onto an array of photo detectors. This is done with the aid of lens 8. The photo detectors may comprise a square array of, say, 12 to 24 detectors on a side, each detector being a photo transistor whose photo sensitive region is 45 by 45 microns and of 60 microns center to center spacing. The photo transistors charge capacitors whose voltages are subsequently digitized and stored in a memory. It is clear that the general level of illumination of the fingertip 6 may be controlled by noticing the output levels of the photo detectors and adjusting the intensity of light issuing from the LED 2. This could be either continuous control or pulse width modulation, or some combination of both.

The preferred optical navigation optically detects motion by directly imaging as an array of pixels the various particular optical features visible at surface 5, much as human vision is believed to do. IR light reflected from a textured work surface pressed against surface 5 is focused onto a suitable array (say, 16×16 or 24×24) of photo detectors. The LED may be continuously on with either a steady or variable amount of illumination served to maximize some aspect of performance (e.g., the dynamic range of the photo detectors in conjunction with the albedo of the work surface). Alternatively, a charge accumulation mechanism coupled to the photo detectors may be "shuttered" (by current shunting switches) and the LED pulsed on and off to control the exposure by servoing the average amount of light. Turning the LED off also saves power; an important consideration in battery operated environments. The responses of the individual photo detectors are digitized to a suitable resolution (say, six or eight bits) and stored as a frame into corresponding locations within an array of memory.

Preferably, the size of the image projected onto the photo detectors is a near unity magnification of the original features being imaged. The size of the photo detectors and their spacing is such that there is much more likely to be one or several adjacent photo detectors per image feature, rather than the other way around. Thus, the pixel size represented by the individual photo detectors corresponds to a spatial region on the work surface of a size that is generally smaller than the size of a typical spatial feature on that work surface, which is intended to be a ridge in the whorls of skin on the fingertip 6. The overall size of the array of photo detectors is preferably large enough to receive an image having several features. In this way, images of such spatial features produce translated patterns of pixel information as the fingertip 6 moves. The number of photo detectors in the array and the frame rate at which their contents are digitized and captured cooperate to influence how fast the fingertip 6 can be moved over the surface 5 and still be tracked. Tracking is accomplished by comparing a newly captured sample frame with a previously captured reference frame to ascertain the direction and amount of movement.

One way that may be done is to shift the entire content of one of the frames by a distance of one pixel (corresponds to a photo detector), successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" is also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information may be scaled and or accumulated to provide display pointer movement information ($\Delta X$ and $\Delta Y$) of a convenient granularity and at a suitable rate of information exchange.

The actual algorithms described in the incorporated Patents (and used by the instant mouseless pointer control mechanism) are refined and sophisticated versions of those described above. For example, let us say that the photo detectors were a 16×16 array. We could say that we initially take a reference frame by storing the digitized values of the photo detector outputs as they appear at some time $t_0$. At some later time t, we take a sample frame and store another set of digitized values. We wish to correlate a new collection of nine comparison frames (thought to be, null, one over, one over and one up, etc.) against a version of the reference frame representing "where we were last time". The comparison frames are temporarily shifted versions of the sample frame; note that when shifted a comparison frame will no longer overlap the reference frame exactly. One edge, or two adjacent edges will be unmatched, as it were. Pixel locations along the unmatched edges will not contribute to the corresponding correlation (i.e., for that particular shift), but all the others will. And those others are a substantial number of pixels, which gives rise to a very good signal to noise ratio. For "nearest neighbor" operation (i.e., limited to null, one over, one up/down, and the combinations thereof) the correlation produces nine "correlation values", which may be derived from a summing of squared differences for all pixel locations having spatial correspondence (i.e., a pixel location in one frame that is indeed paired with a pixel location in the other frame—unmatched edges won't have such pairing).

A brief note is perhaps in order about how the shifting is done and the correlation values obtained. The shifting is accomplished by using address offsets for memories that can output an entire row or column of an array at one time. Dedicated arithmetic circuitry is connected to the memory array that contains the reference frame being shifted and to the memory array that contains the sample frame. The formulation of the correlation value for a particular trial shift (member of the nearest or near neighbor collection) is accomplished very quickly. The best mechanical analogy is to imagine a transparent (reference) film of clear and dark patterns arranged as if it were a checker board, except that the arrangement is perhaps random. Now imagine that a second (sample) film having the same general pattern is overlaid upon the first, except that it is the negative image (dark and clear are interchanged). Now the pair is aligned and held up to the light. As the reference film is moved relative to the sample film the amount of light admitted through the combination will vary according to the degree that the images coincide. The positioning that admits the least light is the best correlation. If the negative image pattern of the reference film is a square or two displaced from the image of the sample film, the positioning admits the least light will be one that matches that displacement. We take note of which displacement admits the least light; for mouseless screen pointer control we notice the positioning with the best correlation and say that the fingertip moved that much. That, in effect, is what happens within an integrated circuit (IC) having photo detectors, memory and arithmetic circuits arranged to implement the image correlation and tracking technique we are describing.

It would be desirable if a given reference frame could be re-used with successive sample frames. At the same time, each new collection of nine (or twenty-five) correlation values (for collections at $t_i$, $t_{i+1}$, etc.) that originates from a new image at the photo detectors (a next sample frame) should contain a satisfactory correlation. Several successive collections of comparison frames can usually be obtained from the (16×16) reference frame taken at $t_0$. What allows this to be done is maintaining direction and displacement data for the most recent motion (which is equivalent to knowing velocity and time interval since the previous measurement). This allows "prediction" of how to (permanently!) shift the collection of pixels in the reference frame so that for the next sample frame a "nearest neighbor" can be expected to correlate. This shifting to accommodate prediction throws away, or removes, some of the reference frame, reducing the size of the reference frame and degrading the statistical quality of the correlations. When an edge of the shifted and reduced reference frame begins to approach the center of what was the original reference frame it is time to take a new reference frame. This manner of operation is termed "prediction" and could also be used with comparison frames for an extended "near neighbor" (null, two over/one up, one over/two up, one over/one up, two over, one over, . . . ) algorithm. The benefits of prediction are a speeding up of the tracking process by streamlining internal correlation procedure (avoiding the comparison of two arbitrarily related 16×16 arrays of data) and a reduction of the percentage of time devoted to acquiring reference frames.

The motion sensor may have a "hold" function that suspends the production of movement signals to the computer, allowing the fingertip 6 to be physically removed from the surface 5 without disturbing the position on the screen of the pointer. This may be needed if the operator runs out of room to physically move his finger further, but the screen pointer still needs to go further. The corresponding usual mouse maneuver executed by the operator for, say, an extended rightward excursion, is to simply pick the mouse up at the right side of the work surface, set it down on the left and continue to move it to the right. What is needed in the present setting is a way to keep the motion indicating signals from undergoing spurious behavior during the corresponding maneuver of raising the finger, moving it back, and replacing it on surface 5, so that the pointer on the screen behaves in an expected and non-obnoxious manner. The "hold" function may be performed automatically by noticing that all or a majority of the pixels in the image have "gone dark" (it's actually somewhat more complicated than that, as explained below).

What happens, of course, is that the IR light from the illuminating LED no longer reaches the photo detectors in the same quantity that it did, if at all; the reflecting surface is too far away or is simply not in view. However, if the fingertip 6 is removed and the surface 5 is exposed to an intensely lit environment as a result, then the outputs of the photo detectors might be at any level. The key is that they will be uniform, or nearly so. The main reason that they become uniform is that there is no longer a focused image; all the image features are indistinct and they are each spread out over the entire collection of photo detectors. So the photo detectors uniformly come to some average level. This is in distinct contrast with the case when there is a focused image. In the focused case the correlations between frames (recall the one over, one over and one down, etc.) exhibit a distinct phenomenon.

Assume that the spatial features being tracked mapped exactly onto the photo detectors, through the lens system, and that fingertip's movement were jerky by exactly the amount and in the directions needed for a feature to go from detector to detector. Now for simplicity assume also that there is only one feature, and that its image is the size of a photo detector. So, all the photo detectors but one are all at pretty much the same level, and the one detector that is not at that level is at a substantially different level, owing to the feature. Under these highly idealized conditions it is clear that the correlations will be very well behaved; eight "large" differences and one small difference (a sink hole in an otherwise fairly flat surface) in a system using nine trials for a nearest neighbor algorithm (and remembering that there may have been no motion). [Note: The astute reader will notice that the "large" difference in this rather contrived example actually corresponds to, or originates with, only one pixel, and probably does not deserve to be called "large"—recall the earlier shifted film analogy. The only light passed by the films for this example would be for the one pixel of the feature. A more normal image having a considerably more diverse collection of pixels increases the difference to where it truly is a "large" difference.]

Now, such highly idealized conditions are not the usual case. It is more normal for the image of the tracked spatial features to be both larger and smaller than the size of the photo detectors, and for the motion of the fingertip 6 to be continuous, following a path that allows those images to fall onto more than one detector at once. Some of the detectors will receive only a partial image, which is to say, some detectors will perform an analog addition of both light and dark. The result is at least a "broadening" of the sink hole (in terms of the number of photo detectors associated with it) and very possibly a corresponding decrease in the depth of the sink hole. The situation may be suggested by imagining a heavy ball rolling along a taut but very stretchable membrane. The membrane has a discrete integer Cartesian coordinate system associated with it. How much does the membrane distend at any integer coordinate location as the ball rolls? First imagine that the ball is of a very small diameter but very heavy, and then imagine that the ball is of a large diameter, but still weighs the same. The analogy may not be exact, but it serves to illustrate the idea of the "sink hole" mentioned above. The general case is that the generally flat surface with sharply defined sink hole becomes a broad concavity, or bowl.

We shall term the surface produced or described by the various correlation values the "correlation surface."

We say all of this to make two points. First, the shifting shape of the concavity in the correlation surface as the fingertip 6 moves allows interpolation to a granularity finer than the simple size/spacing of the photo detectors. We point this out, with the remark that the motion detector 9 can do that, and leave it at that. The full details of interpolation are described in the incorporated Patents. No further discussion of interpolation is believed necessary. Second, and this is our real reason for the discussion of the preceding paragraphs, is the observation that what happens when the fingertip 6 is absent from surface 5 is that the concavity in the correlation surface goes away, to be replaced by generally equal values for the correlations (i.e., a "flat" correlation surface). It is when this happens that we may say with considerable assurance that the fingertip 6 is absent, and can then automatically invoke the hold feature, until after such time that a suitable concavity ("bowl") reappears.

This concludes our digression about the nature and internal operation of the motion sensor 9. We now resume our discussion of how to use it to go "mouseless".

Figure 2:
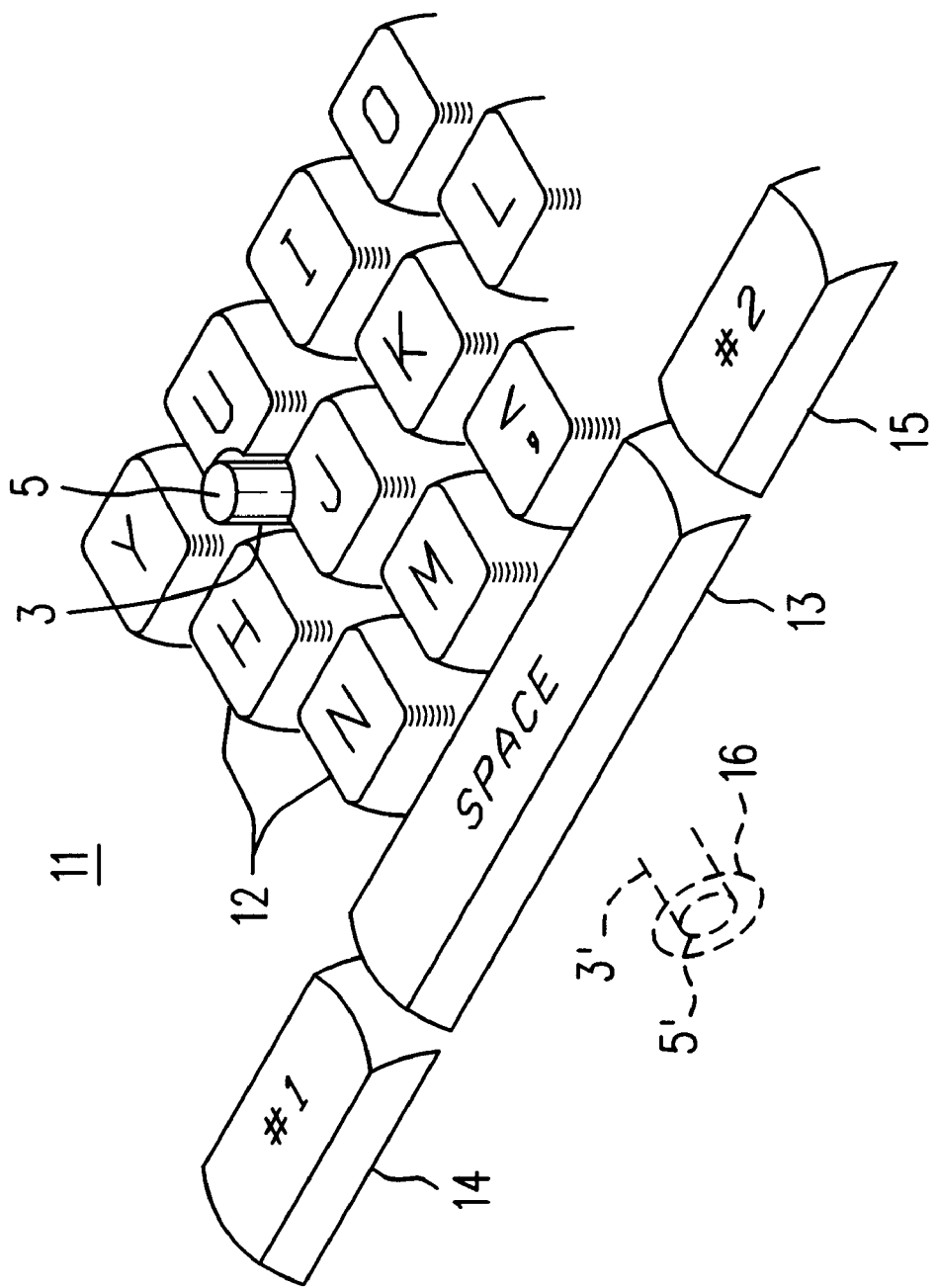
FIG. 2 is perspective view of a top portion of a computer keyboard having an optical stud near the "J" key that is part of a motion translation type screen pointer control mechanism, having keys to take the place of the conventional mouse buttons, and also showing an optional location on the front bezel of the keyboard for a horizontally mounted optical stud.

Refer now to FIG. 2, which is a perspective top view of a portion of a computer keyboard, possibly, but not necessarily, for a laptop computer. Note that the transparent stud 3 is located in the vicinity of the adjoining corners of the "H", "i", "Y" and "U" keys of a traditional QWERTY keyboard. If another keycap layout were used, then it is located along a left and upward path from the home position of the right index (pointer) finger. And if one is so perverse as to insist on equal rights for the left hand (forgive the pun), then it could be located to the right and upward from the home position of the left index finger (at the adjoining corners of the "F", "R", "T" and "G" keys). Finally, there is no special magic in the upward direction; it might be downward, although that curves the finger so that the fingernail is possibly in the way. (Reaching upward straightens the finger, and thus moves the fingernail out of the way.) Also, we mustn't be prejudiced in favor of the index finger over the adjacent finger (the longest, or so called middle finger). Overall, however, the best choice among these is probably the one shown in the figure. Notice that it may be desirable to alter the normal shape of the keycaps adjoining the transparent stud 3.

In any event, the idea is that the user places his fingertip onto surface 5 and then moves his finger to cause motion of the screen pointer. He may have to raise, retrace and replace his finger once or twice for really large screens. It all happens very quickly and naturally, however, and with very little motion compared to swiping with a mouse, so that this is not objectionable.

Now, getting the screen pointer to point at a desired location on the screen is only part of the functionality provided by the mouse that we aim to eliminate. We also need a way to "click" and "double click", to use the conventional terminology. And we should also preserve the customary two buttons (#1 and #2) found on the typical conventional mouse.

To this end, note that one way to accomplish this is to shorten the conventional SPACE bar and add a new key in the space then available at each end. Normally, the SPACE bar is pressed with the thumbs, which point toward the middle of the SPACE bar. The conventional SPACE bar is wastefully long. In the figure the conventional SPACE bar has been divided into three keys: a shortened SPACE bar 13 (now about two, or maybe three "keys" long, instead of say, seven), and two new auxiliary keys 14 and 15 that perform the functions of the mouse buttons on the now absent mouse. By slightly curling the thumbs towards the palms of the hands they move into position to press key 14 (mouse button #1) or key 15 (mouse button #2).

Some variations are possible. If the principal need was for a one button mouse, then one could easily arrange for a signal to be available from the motion sensor indicating that it "sees something" (a fingertip), and then when that signal is present take an activation of the conventional SPACE bar as an activation of the mouse button, instead of transmitting the keycode for "space" to some executing application. Alternatively, the transparent stud 3 could be mounted on a pressure sensitive switch or transducer that performed the function of pressing the mouse button when the finger presses firmly against the surface 5.

An attractive variation is to locate a transparent stud 3' horizontally on the vertical portion of the keyboard bezel's front edge, as indicated by the dashed lines for 3', 5' and 16. The reference character 16 represents an aperture in that bezel (not itself shown) through which alternate transparent stud 3' projects to expose surface 5'. In use, either thumb is lowered to cover surface 5'. Movement of that thumb moves the screen pointer. Mouse buttons #1 (14) and #2 (15) are activated by slightly curling the index fingers and then pressing them downward against the appropriate key.

In operation, images need to be acquired by at a rate sufficient that successive images differ in distance by no more that perhaps a quarter the width of the array, or 4 pixels for a 16×16 array of photo sensors. Experiments sow that a finger speed of 50 mm/sec is not unreasonable. With 1:1 imaging, this corresponds to a speed at the array of 800 pixels per second. To meet a requirement of not moving more than four pixels per cycle, a measurement rate of 200 per second is needed. This rate is quite practical, and it may be desirable to operate at several times this rate.

A reasonable amount of motion for a single swipe of a finger across the surface 5 is on the order of 10 mm. It may be desirable for a single swipe to cause the screen pointer to traverse the entire screen. For an array having a 60 micron pitch this corresponds to a 166 pixel translation at the array. Mapping this into screen having over a thousand pixels might, while perhaps usable, be a fairly coarse degree of control by modern standards. This is readily fixed by interpolating to ⅛ pixel at the array pixel level, and the incorporated Patents tell how to do it. That degree of interpolation is quite possible even with 16×16 arrays and 5×5 comparison frames.

We claim:

1. Apparatus for controlling the position of a screen pointer for a computer system, the apparatus comprising:
   a rod lens having an imaging surface at one end against which a portion of the tip of a human digit may be placed, and having an opposite distal end into which light may enter, be reflected from the portion of the tip of the digit as an image thereof and exit in a direction generally opposite to that in which it entered;
   a light source disposed proximate the distal end of the rod lens, that emits light which enters the rod lens at the distal end and then illuminates the entirety of that portion of the tip of the digit that is placed against the imaging surface; and
   a motion transducer disposed proximate the distal end of the rod lens and that receives the reflected image, from a subset of which the motion transducer creates pixelized representations comprising a reference array and shifted versions thereof that are nearest neighbor arrays, each array being of multi-bit digitized values stored in memory, which reference and nearest neighbor arrays are correlated with a newly acquired sample array to produce signals indicative of motion in orthogonal axes of the tip of the digit across the imaging surface.

2. Apparatus as in claim 1 wherein the rod lens is placed amongst keys in a keyboard in a location that is adjacent to an index digit and with the imaging surface just above the tops of the keys.

3. Apparatus as in claim 1 wherein the imaging surface of the rod lens extends through an aperture in a bezel for a keyboard, the aperture in a central frontal location thereof that may be covered by the tip of a human thumb when an index digit is positioned over a home key on the keyboard.

4. Apparatus as in claim 1 further comprising a keyboard whose SPACE bar is approximately the length of two to three regular keys, and immediately on each side of which are additional keys that when pressed operate as if buttons on a mouse had been pressed.

5. A method of controlling the position of a screen pointer for a computer system comprising the steps of:
   placing a portion of an appendage of the human hand against an imaging surface at one end of a rod lens;
   directing light into an other end of the rod lens to illuminate in its entirety that portion of the appendage that is against the imaging surface;
   focusing an image reflected from the portion of the appendage onto an array of photo detectors proximate the other end of the rod lens;
   digitizing to multiple bits the output values of the photo detectors and storing the multi-bit digital results as a reference array in a memory;
   subsequent to storing the reference array, digitizing to multiple bits the output values of the photo detectors and storing the multi-bit digital results as a sample array in a memory;
   correlating the sample array with the reference array and also with nearest neighbor shifted versions of the reference array to produce motion signals indicative of motion in orthogonal axes across the imaging surface by the appendage; and
   adjusting the position of a screen pointer in accordance with the motion signals.

6. Apparatus as in claim 1 wherein the correlated arrays permit interpolation of amounts of motion less than the size of spatial features in the image.

7. Apparatus for controlling the position of a screen pointer for a computer system, the apparatus comprising:

a rod lens having an imaging surface at one end against which the tip of a human digit may be placed, and having an opposite distal end into which light may enter, reflect from the tip of the digit and exit in a direction generally opposite to that in which it entered, and wherein the rod lens is placed amongst keys in a keyboard in a location that is adjacent to an index digit and with the imaging surface just above the tops of the keys;

a light source disposed proximate the distal end of the rod lens and that emits light that enters the rod lens at the distal end; and a motion transducer disposed proximate the distal end of the rod lens and that receives light that reflects from the tip of the digit and that exits the distal end of the rod lens, the motion detector producing signals indicative of motion in orthogonal axes of the tip of the digit across the imaging surface.

8. Apparatus for controlling the position of a screen pointer for a computer system, the apparatus comprising:

a rod lens having an imaging surface at one end against which the tip of a human digit may be placed, and having an opposite distal end into which light may enter, reflect from the tip of the digit and exit in a direction generally opposite to that in which it entered, and wherein the imaging surface of the rod lens extends through an aperture in a bezel for a keyboard, the aperture in a central frontal location thereof that may be covered by the tip of a human thumb when an index digit is positioned over a home key on the keyboard;

a light source disposed proximate the distal end of the rod lens and that emits light that enters the rod lens at the distal end; and a motion transducer disposed proximate the distal end of the rod lens and that receives light that reflects from the tip of the digit and that exits the distal end of the rod lens, the motion detector producing signals indicative of motion in orthogonal axes of the tip of the digit across the imaging surface.

9. Apparatus for controlling the position of a screen pointer for a computer system, the apparatus comprising:

a rod lens having an imaging surface at one end against which the tip of a human digit may be placed, and having an opposite distal end into which light may enter, reflect from the tip of the digit and exit in a direction generally opposite to that in which it entered;

a light source disposed proximate the distal end of the rod lens and that emits light that enters the rod lens at the distal end;

a motion transducer disposed proximate the distal end of the rod lens and that receives light that reflects from the tip of the digit and that exits the distal end of the rod lens, the motion detector producing signals indicative of motion in orthogonal axes of the tip of the digit across the imaging surface; and a keyboard whose SPACE bar is approximately the length of two to three regular keys, and immediately on each side of which are additional keys that when pressed operate as if buttons on a mouse had been pressed.

* * * * *